US011360055B2

(12) United States Patent
Stark et al.

(10) Patent No.: US 11,360,055 B2
(45) Date of Patent: Jun. 14, 2022

(54) IN-LINE INSPECTION DEVICES

(71) Applicant: Halliburton Energy Services, Inc., Houston, TX (US)

(72) Inventors: Daniel Joshua Stark, Houston, TX (US); Ilker R. Capoglu, Houston, TX (US); Aurel Adrian Popoviciu, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 305 days.

(21) Appl. No.: 16/605,313

(22) PCT Filed: Jan. 7, 2019

(86) PCT No.: PCT/US2019/012539
§ 371 (c)(1),
(2) Date: Oct. 15, 2019

(87) PCT Pub. No.: WO2020/145937
PCT Pub. Date: Jul. 16, 2020

(65) Prior Publication Data
US 2021/0364479 A1    Nov. 25, 2021

(51) Int. Cl.
*G01N 29/04* (2006.01)
*G01N 29/12* (2006.01)
*G01N 29/24* (2006.01)

(52) U.S. Cl.
CPC ....... *G01N 29/2481* (2013.01); *G01N 29/043* (2013.01); *G01N 29/12* (2013.01);
(Continued)

(58) Field of Classification Search
CPC ........ G01N 29/24; G01N 29/04; G01N 29/12; G01N 2291/015; G01N 2291/042
(Continued)

(56) References Cited

U.S. PATENT DOCUMENTS

| 5,587,534 A | 12/1996 | McColskey et al. |
| 6,791,318 B2 | 9/2004 | Paulson et al. |

(Continued)

FOREIGN PATENT DOCUMENTS

| WO | 2017151117 | 9/2017 | |
| WO | 2018031038 | 2/2018 | |
| WO | WO2020145937 | * 7/2020 | ............. G01N 29/24 |

OTHER PUBLICATIONS

International Search Report and Written Opinion dated Oct. 7, 2019; PCT International Application No. PCT/US2019/012539.

*Primary Examiner* — Jacques M Saint Surin
(74) *Attorney, Agent, or Firm* — McGuireWoods LLP (57) ABSTRACT

The disclosed embodiments include in-line inspection devices, methods to perform in-line inspections of pipeline and protective casings, and methods to determine anomalies of pipeline and protective casings. The method includes deploying an in-line inspection device in a section of a pipeline enclosed by a protective casing. While the in-line inspection device is traveling along the pipeline, the method also includes transmitting, at a frequency, a transmitted signal toward the protective casing; and detecting a scattered signal scattered by the protective casing. The method further includes detecting a scattered signal scattered by the protective casing. The method further includes locating an anomaly of the protective casing based on the scattered signal.

20 Claims, 4 Drawing Sheets

(52) U.S. Cl.
CPC ............. *G01N 2291/015* (2013.01); *G01N 2291/0423* (2013.01)

(58) Field of Classification Search
USPC .......................................... 73/592
See application file for complete search history.

(56) References Cited

U.S. PATENT DOCUMENTS

| | | | |
|---|---|---|---|
| 10,989,695 B2* | 4/2021 | Zhu | ............ B66D 1/54 |
| 2001/0017541 A1 | 8/2001 | Kwun et al. | |
| 2011/0041612 A1 | 2/2011 | Paige | |
| 2011/0137615 A1* | 6/2011 | Motzer | ............ G01N 29/2481 703/1 |
| 2012/0167688 A1* | 7/2012 | Minachi | ............ G01N 29/46 73/602 |
| 2013/0068028 A1 | 3/2013 | Hoyt | |
| 2013/0104659 A1* | 5/2013 | Parker | ............ G01N 29/043 73/627 |
| 2013/0193953 A1 | 8/2013 | Yarbro | |
| 2017/0191361 A1 | 7/2017 | Aminen | |
| 2017/0261469 A1 | 9/2017 | Chang et al. | |
| 2018/0149622 A1 | 5/2018 | Vieau et al. | |
| 2018/0172876 A1 | 6/2018 | Inanc et al. | |

* cited by examiner

IN-LINE INSPECTION DEVICES

BACKGROUND

The present disclosure relates generally to in-line inspection devices, methods to perform in-line inspections of pipeline and pipeline casings, and methods to determine anomalies of pipeline and pipeline casings.

In high-risk areas, such as roads, railroads, and river crossings, pipeline integrity is protected by pipeline casings. A pipeline failure can be dangerous, so cased pipelines are periodically inspected to reduce the likelihood of pipeline failure. Inspections of pipeline casings focus on the structural integrity, filler quantity, quality, and electrical isolation between pipeline and casing.

Conventional inspections of pipeline casings require excavation and exposure of casing ends. However, excavations often require significant planning and logistics, are financially costly, and may impact nearby infrastructure. Further, pipeline casings may be damaged during excavation, thereby increasing the likelihood of pipeline failure.

BRIEF DESCRIPTION OF THE DRAWINGS

Illustrative embodiments of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to in-line inspection devices, methods to perform in-line inspections of pipeline and protective casings, and methods to determine anomalies and defects of pipeline and protective casings. The in-line inspection device may be any device or tool that is deployable inside a pipeline and operable of performing inspections from inside the pipeline. As referred to herein, a pipeline refers to any conduits formed from one or more pipes that provide transportation of fluids within the conduits. In some embodiments, some sections of a pipeline are buried under a subterranean surface. Examples of in-line inspection devices include smart pigs, tethered pigs, robotic devices, as well as other devices and tools that are deployable inside a pipeline and operable of performing inspections of the pipeline and protective casing from inside the pipeline. The in-line inspection device includes one or more axially-oriented transmitters, one or more axially-oriented receivers, one or more processors (processors), and a storage medium.

After the in-line inspection device is deployed inside the pipeline, the in-line inspection device travels along the pipeline to determine anomalies of the protective casing and/or the pipeline. In one or more embodiments, where the pipeline carries a fluid (e.g., hydrocarbon resources), the in-line inspection device can be carried by fluid flow along the pipeline. In one or more embodiments, the in-line inspection device has a propeller or another component that allows the in-line inspection device to travel inside the pipeline. In one or more of such embodiments, the propeller helps the in-line inspection device to travel along the pipeline at an optimum or at a predetermined velocity.

As the in-line inspection device travels in the pipeline, the one or more transmitters periodically or continuously transmit signals. In some embodiments, different transmitters of the in-line inspection device are aligned orthogonally relative to each other to facilitate transmission of the signals in different orthogonal directions. In some embodiments, different transmitters of the in-line inspection device are axially aligned relative to each other or aligned in other orientations to facilitate transmission of the signals. In one or more of such embodiments, emitter coils of the transmitters have multiple configurations to generate a desired shaped magnetic field for an orientation. In one or more embodiments, different transmitters of the in-line inspection device transmit signals at different frequencies (e.g., between 30 Hz and 1 kHz) to determine not only the anomalies of the protective casing, but also anomalies of the pipeline, as well as other components deployed in or around the protective casing, as well as other layers of pipe, armor, sheaths, or carcasses that enclose the pipeline.

In one or more of such embodiments, the in-line inspection device has a first transmitter that transmits signals at a first frequency, where the signals are fine-tuned to scatter after interacting with the protective casing. Further, the in-line inspection device also includes a second transmitter that transmits signals at a second frequency that is higher than the first frequency, where the signals are fine-tuned to scatter after interacting with the pipeline. In one or more of such embodiments, the first transmitter and the second transmitter are simultaneously transmitting signals at different frequencies to locate anomalies of the protective casing and the pipeline. In one or more of such embodiments, the second transmitter transmits signals at a higher frequency due to higher frequencies having smaller depth of investigation. In one or more of such embodiments, the value of the frequency at which the signals are transmitted monotonically increases relative to the velocity at which the in-line inspection device travels along the pipeline. In one or more of such embodiments, where the in-line inspection device contains multiple pairs of transmitters and receivers, the in-line inspection device is operable to operate some or all of the transmitter and receiver pairs to transmit at varying frequencies, identical frequencies, or almost identical frequencies. Although in some embodiments, the first transmitter is fine-tuned to transmit signals that scatter after interacting with the protective casing, in some embodiments, the first transmitter is fine-tuned to transmit signals that scatter after interacting with pipeline, or another structure around the in-line inspection device. Similarly, although in some embodiments, the second transmitter is fine-tuned to transmit signals that scatter after interacting with the pipeline, in some embodiments, the second transmitter is fined-tuned to transmit signals that scatter after interacting with the protective casing, or another structure around the in-line inspection device.

The transmitted signals interact with the pipeline or the protective casing and some of the signals are scattered in response to interacting with the pipeline or the protective casing, and some of the scattered signals are detected by the receivers. In some embodiments, different receivers of the in-line inspection device are tuned to detect signals transmitted at different frequencies. In some embodiments, different receivers of the in-line inspection device are aligned orthogonally relative to each other to facilitate detection of the signals in different orthogonal directions. In some embodiments, different receivers of the in-line inspection device are axially aligned relative to each other or aligned in other orientations to detect signals from different directions. In one or more of such embodiments, where the in-line inspection device has a first receiver tuned to detect scattered signals scattered by the protective casing and a second axially-oriented receiver tuned to detect scattered signals scattered by the pipeline. In some embodiments, each of the first and second receivers is capable of detecting scattered signals scattered by both the protective casing and the pipeline. In some embodiments, the in-line inspection device also includes a bucking coil or another component that reduces a portion of the (non-scattered) signals transmitted by the transmitters from being detected by the receivers. As referred to herein, a bucking coil is a coil that reduces or bucks out the direct coupling between transmitters and receivers, for example, in a mutually-balanced array configuration. In one or more embodiments, the bucking coil has a polarity that is opposite the polarity of the receivers of the in-line inspection device.

The processors obtain and record the scattered signals and identifies the potential presence of anomalies of the protective casing based on the detected scattered signals. In some embodiments, the processors also indicate the azimuthal and linear locations of the anomalies. In some embodiments, where the anomaly is on the protective casing, the processors determine a wall-thickness of the protective casing at a location of the anomaly. In one or more of such embodiments, the processors perform an inversion of data indicative of the scattered signals and determine the nominal wall-thickness and the wall-thickness at a location of the anomaly of the protective casing. In some embodiments, where the anomaly is on the pipeline, the processors determine the nominal wall-thickness and the wall-thickness at a location of the anomaly. In some embodiments, the processors also determine an eccentricity of the protective casing. More particularly, the processors determine the spacing between the pipeline and the protective casing based on the scattered signals. In some embodiments, the processors determine one or more geometrical and constitutive parameters of the pipeline-protective casing system (e.g., eccentricity) by solving an inversion algorithm. Data indicative of the detected scattered signals as well as data indicative of anomalies of the protective casing are stored in the storage medium.

In some embodiments, in-line inspection device 120 also periodically or continuously transmits data indicative of the detected scattered signals and data indicative of anomalies (e.g., azimuthal or linear location of the anomaly, amount of metal loss, etc.) of the pipeline and protective casing to a surface-based device for further processing. Additional descriptions of the foregoing devices and methods are described in the paragraphs below and are illustrated in FIGS. 1-4.

Figure 1:
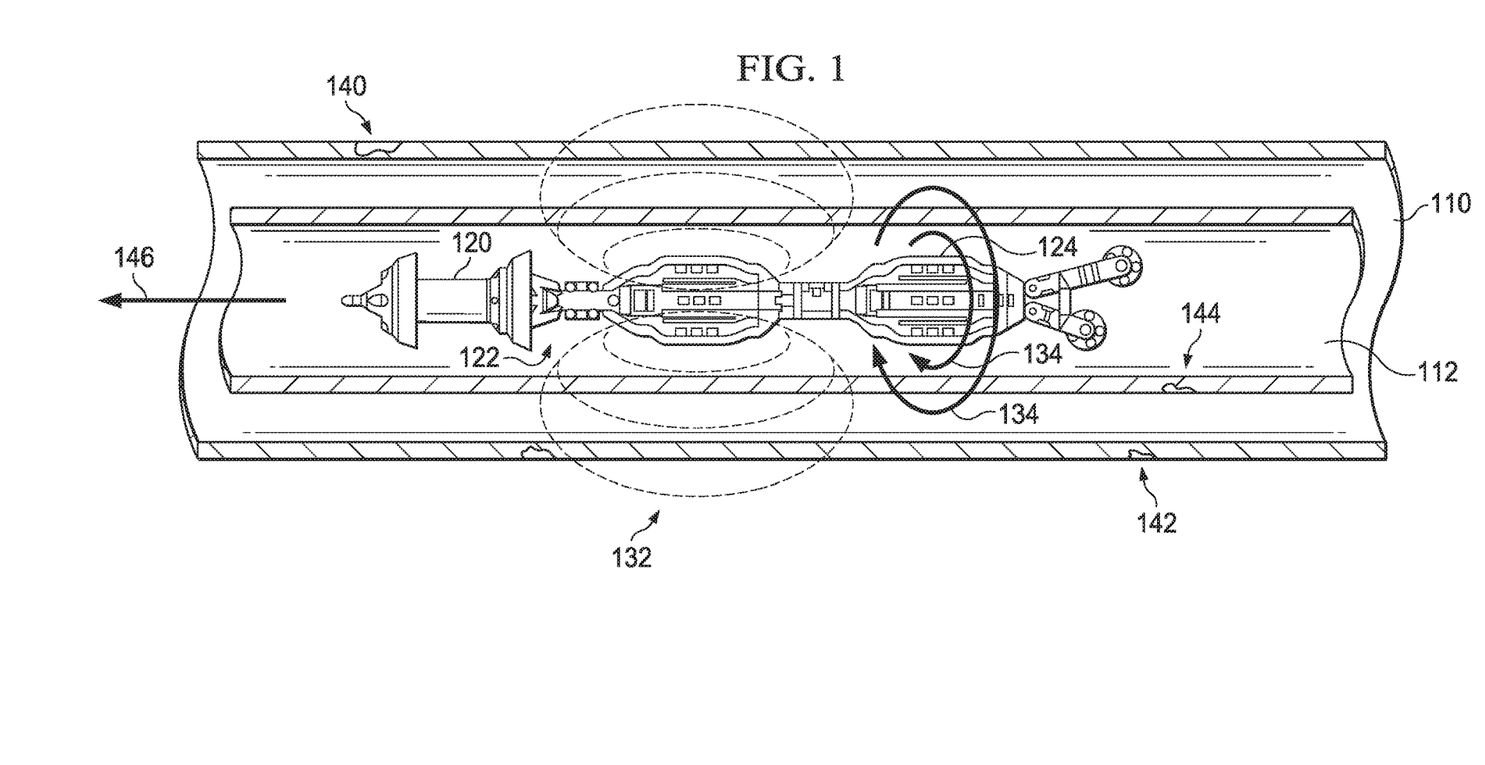
FIG. 1 is a schematic diagram of an in-line inspection (ILI) device traveling in an encased pipeline.

Turning now to the figures, FIG. 1 is a schematic diagram of an in-line inspection device 120 traveling in a pipeline 112. In the embodiment of FIG. 1, pipeline 112 is enclosed within a protective casing. As used herein, a protective casing is any casing that is formed around a pipeline. In the embodiment of FIG. 1, the protective casing is a pipeline casing and is referred to as pipeline casing 110.

In-line inspection device 120 has a transmitter 122, and a receiver 124. In the embodiment of FIG. 1, transmitter 122 is an axially-oriented transmitter and receiver 124 is an axially-oriented receiver. In the embodiment of FIG. 1, in-line inspection device 120 travels in pipeline 112 in a direction indicated by arrow 146. In some embodiments, in-line inspection device 120 travels in pipeline 112 at an optimum inspection velocity (between approximately 1 foot per minute and approximately 7 feet per second). In some embodiments, where in-line inspection device 120 is a free-swimming device, a fluid flowing in pipeline 112 propels in-line inspection device 120 in the direction indicated by arrow 146. In some embodiments, where in-line inspection device 120 is a tethered or a robotic device, in-line inspection device 120 has a self-propelling component that allows in-line inspection device 120 to travel in pipeline 112 even when fluid is not flowing within pipeline 112, or is flowing at a rate that is less than or more than a desired velocity of in-line inspection device 120. As in-line inspection device 120 travels in pipeline 112, transmitter 122 transmits signals toward pipeline 112 and pipeline casing 110. In some embodiments, transmitter 122 generates a magnetic field 132 that induces an eddy current 134 in pipeline 112 and/or pipeline casing 110. In some embodiments, transmitter 122 transmits signals within a range of frequencies selected to optimize interaction with pipeline 112 and/or the pipeline casing 110. In some embodiments, signals are transmitted between 30 Hz and 1 kHz. In some embodiments, transmitter 122 transmits the signals at discrete frequencies. In some embodiments, transmitter 122 transmits the signals within a spectrum of frequencies.

Some of the signals transmitted by transmitter 122 penetrate pipeline 112 and are scattered by pipeline casing 110, where the scattered signals are indicative of an altered electromagnetic wave generated by eddy currents 134. Receiver 124 is formed from one or more coils that are operable of detecting signals scattered by pipeline casing 110. In some embodiments, where signals transmitted by transmitter 122 are scattered by pipeline 112, the coils are also operable of detecting signals scattered by pipeline 112. In some embodiments, in-line inspection device 120 also includes a bucking coil or another component that reduces a portion of the signals transmitted by transmitter 122 from being detected by receiver 124, thereby minimizing direct coupling of the transmitter 122 and receiver 124, and improving detection of the scattered signals. Although FIG. 1 illustrates one transmitter 122 and one receiver 124, in some embodiments, in-line inspection device 120 includes multiple transmitters and receivers. In some embodiments, in-line inspection device 120 includes a second transmitter that is orthogonally aligned with transmitter 122, and a second receiver that is orthogonally aligned with receiver 124 to facilitate transmission of the signals in different orthogonal directions. In one or more of such embodiments, transmitter 122 transmits signals at a first frequency that is fine tuned for penetrating pipeline 112 and is fined tuned for scattering when the transmitted signals are in contact with pipeline casing 110, whereas the second transmitter transmits signals at a second frequency that is fined tuned for scattering when the transmitted signals are in contact with pipeline 112. In some embodiments, transmitter 122, receiver 124, and other transmitters and receivers of in-line inspection device 120 are placed at different azimuthal locations to transmit signals to different angular sectors of pipeline 112 and pipeline casing 110, or to detect signals scattered from different angular sectors of pipeline 112 and pipeline casing 110.

In-line inspection device 120 also includes one or more processors (not shown) that are operable of inverting the scattered signals (scattered by pipeline casing 110 or by pipeline 112) to determine a wall-thickness of a location 140 or 142 of pipeline casing 110 at or near which the transmitted signals were scattered. In the embodiment of FIG. 1, the processors invert the scattered signals scattered by pipeline casing 110 at locations 140 and 142 of pipeline casing 110, and invert the scattered signals scattered by pipeline 112 at location 144. In some embodiments, the processors also determine azimuthal and linear locations of the anomalies. In some embodiments, transmitters and receivers of in-line inspection device 120 are oriented to allow eddy currents to travel axially. In one or more of such embodiments, in-line inspection device 120 includes an array of transmitters (not shown) and an array of receivers (not shown) that are circumferentially spaced around in-line inspection device 120 to inspect an azimuthal location of pipeline casing 110 and pipeline 112. For example, the processors are operable of determining a metal loss of pipeline 112 or pipeline casing 110 at a specific angle (e.g., 90% metal loss between 85°-90° around a circumference of pipeline casing 110 at a certain linear distance from a reference point) based on signals detected by the circumferentially spaced receivers. In the illustrated embodiment of FIG. 1, the processors compare the wall-thickness of pipeline casing 110 at locations 140 and 142 with nominal wall-thickness of pipeline casing 110 to determine whether pipeline casing 110 is defective at locations 140 or 142 (e.g., whether pipeline casing 110 has metal loss at locations 140 or 142, and if so, provide the azimuthal and linear locations of the anomaly). Similarly, the processors may compare the wall-thickness of pipeline 112 at location 144 with the wall-thickness of pipeline 112 at other locations of pipeline 112 to determine whether pipeline 112 is defective at location 144. In some embodiments, the wall-thickness of nearby locations of pipeline 112 and pipeline casing 110 were calculated based on detected scattered signals scattered by the pipeline 112 and the pipeline casing 110 at the nearby locations, respectively.

In some embodiments, the processors, after determining the presence of an anomaly (e.g., at locations 140, 142, or 144), transmit data to a surface-based electronic device about the presence of the anomaly. As referred to herein, a surface-based electronic device represents any electronic device operable of receiving data indicative of a presence of an anomaly from in-line inspection device 120. In one or more of such embodiments, data includes data indicative of the anomaly measurements, location (e.g., linear location, azimuthal location, etc.) of the anomaly, and additional information about the anomaly. In one or more embodiments, the data indicative of the scattered signals scattered by pipeline casing 110 or pipeline 112 at a location of interest is analyzed by the surface-based electronic devices.

In-line inspection device 120 also includes a storage medium (not shown). The storage medium may be formed from data storage components such as, but not limited to, read-only memory (ROM), random access memory (RAM), flash memory, solid state hard drives, data storage based on magnetic, optical, or holographic methods, as well as other types of data storage components and devices. In some embodiments, the storage medium includes multiple data storage devices. Data indicative of scattered signals scattered by pipeline 112 or pipeline casing 110 are stored in the storage medium. Further, the processors' instructions, such as instructions to perform an inversion of the scattered signals to determine a wall-thickness of a location of pipeline 112 or pipeline casing 110, instructions to communicate with a surface-based electronic device, as well as other instructions of the processors are stored on the storage medium of in-line inspection device 120. In some embodiments, inspection data of pipeline 112 and pipeline casing 110 are also stored on storage medium, and are accessed by the processors to determine the presence of an anomaly on pipeline 112 or pipeline casing 110.

Although the foregoing paragraphs describe in-line inspection device 120 performing evaluations of pipeline 112 and pipeline casing 110, in-line inspection device 120 is also operable of performing evaluations of the integrity of other components deployed in or around pipeline casing 110. In some embodiments, where spacers are placed between pipeline casing 110 and pipeline 112, in-line inspection device 120 also evaluates the integrity of the spacers (e.g., the eccentricity deviation of pipeline 112) based on the scattered signals. Further, although FIG. 1 illustrates pipeline 112 and pipeline casing 110 as separate structures, the some embodiments, pipeline 112 and pipeline casing 110 are the same structure. Additional descriptions of in-line inspection device 120 are provided in the paragraphs below.

Figure 2:
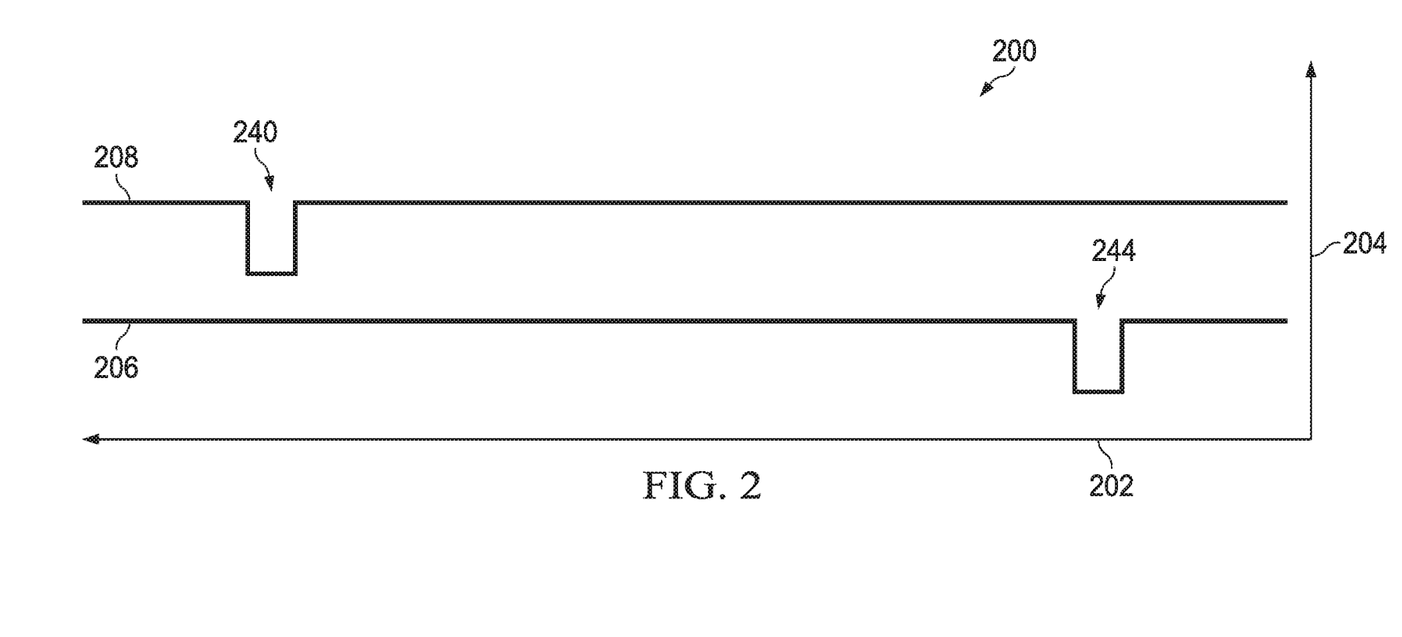
FIG. 2 is a graph indicating anomalies of a section of a pipeline of FIG. 1 and anomalies of a section of a protective casing of FIG. 1 that encloses the pipeline.

FIG. 2 is a graph indicating anomalies of pipeline 112 of FIG. 1 and anomalies of a pipeline casing 110 of FIG. 1 In the embodiment of FIG. 2, axis 202 represents distance along pipeline 112 and pipeline casing 110 in a direction indicated by arrow 146 of FIG. 1, and axis 204 represents the average inspected wall-thickness of pipeline 112 and pipeline casing 110. Further, line 206 represents the average wall-thickness signal of pipeline 112 that in-line inspection device 120 has inspected, and line 208 represents the average wall-thickness of pipeline casing 110 that in-line inspection device 120 has inspected. In the embodiment of FIG. 2, the wall-thickness of pipeline casing 110 at location 240 and the wall-thickness of pipeline 112 at location 244 are less than the nearby wall-thickness of pipeline casing 110 and pipeline 112, respectively. In some embodiments, In-Line-Inspection device 120 (e.g., processors of in-line inspection device 120) determines that pipeline casing 110 and pipeline 112 have anomalies at locations 240 and 244, respectively, upon determining a variance in the wall-thickness of pipeline casing 110 and pipeline 112, respectively. As referred to herein, a variance in the wall-thickness of a protective casing or a pipeline refers to any change in the wall-thickness of the protective casing or the pipeline, respectively, that would contribute to the wall-thickness of the protective casing or pipeline being less than or greater than the nominal wall-thickness of the protective casing or pipeline. In one or more of such embodiments, in-line inspection device 120 determines that the wall-thickness of pipeline casing 110 at location 240 and the wall-thickness of pipeline 112 at location 244 is less than the nearby wall-thickness of pipeline casing 110 and pipeline 112, respectively by a relative or absolute value (e.g., −10% nominal wall thickness, −0.8 cm nominal wall thickness, or another numerical value). In some embodiments, in-line inspection device 120 determines that pipeline casing 110 and pipeline 112 have defects at locations 240 and 244 respectively, upon determining that the wall-thickness of pipeline casing 110 and pipeline 112 at locations 240 and 244, respectively, are over a specified metal loss threshold of wall-thickness for pipeline casing 110 and pipeline 112, respectively.

Figure 3:
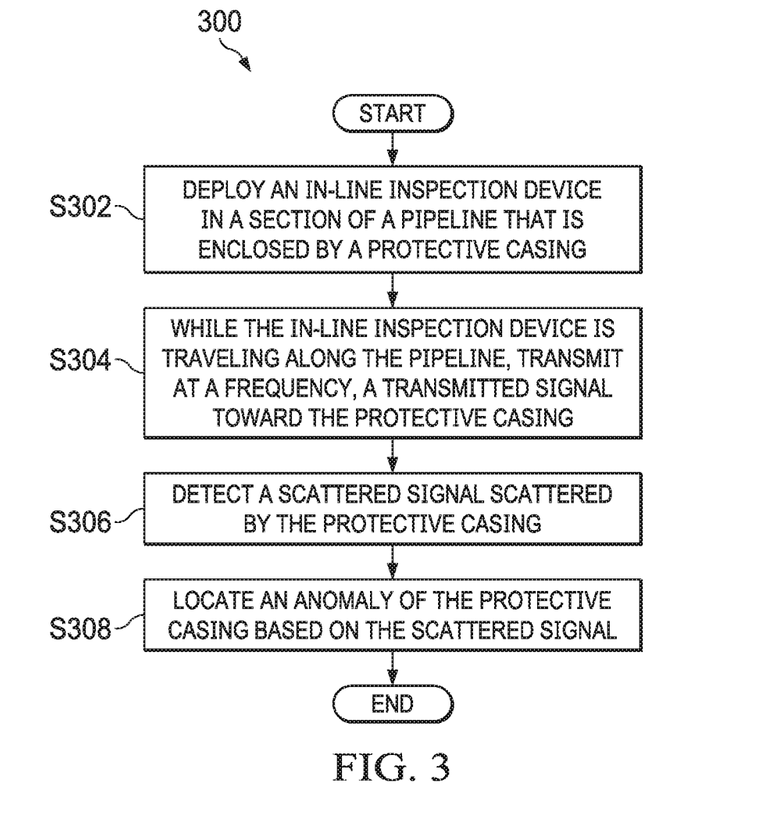
FIG. 3 is a flow chart of a process to determine anomalies of a pipeline and a protective casing.

FIG. 3 is a flow chart of a process 300 to determine anomalies of a pipeline and a protective casing. Although the operations in the process 300 are shown in a particular sequence, certain operations may be performed in different sequences or at the same time where feasible. At block S302, an inspection device, such as in-line inspection device 120 of FIG. 1, is deployed in a pipeline with encased sections, such as pipeline 112 of FIG. 1. As shown in FIG. 1, pipeline 112 is enclosed by pipeline casing 110. At block S304, and while the in-line inspection device is traveling along the pipeline, the in-line inspection device transmits, at a frequency, a signal (e.g., a first transmitted signal) toward a protective casing. In the embodiment illustrated in FIG. 1, in-line inspection device 120 transmits a transmitted signal at a first frequency toward pipeline casing 110 while traveling in pipeline 112 in a direction indicated by arrow 146.

In some embodiments, transmitter 122 as illustrated in FIG. 1 transmits signals between a frequency of 30 Hz and 1 kHz. In one or more of such embodiments, transmitter 122 transmits the signals at discrete frequencies. In one or more of such embodiments, transmitter 122 transmits the signals within a spectrum of frequencies. In one or more of such embodiments, the value of the frequency at which transmitter 122 transmits the signals monotonically increases relative to the velocity at which in-line inspection device 120 travels in pipeline 112. In some embodiments, transmitter 122 transmits signals at different frequencies to facilitate scattering of the signals at different depths of investigations. In one or more of such embodiments, transmitter 122 transmits signals at a first frequency that is selected to allow signals to penetrate pipeline 112 and scatter when the signals interact with pipeline casing 110, and transmits signals at a second, higher frequency that is selected to scatter when the signals interact with pipeline 112. In some embodiments, where in-line inspection device 120 includes multiple transmitters, one of the transmitters transmits signals at a first frequency selected to scatter when the signals interact with pipeline casing 110 and another one of the transmitters transmits signals at a second frequency selected to scatter when the signals interact with pipeline 112. In some embodiments, in-line inspection device 120 includes multiple transmitters that are circumferentially arranged around the device. In one or more of such embodiments, the transmitters are placed at different azimuthal locations to transmit signals (e.g., at same frequency or at different frequencies) to different angular sectors of pipeline 112 and pipeline casing 110.

At block S306, the in-line inspection device detects a scattered signal scattered by the pipeline casing. FIG. 1 illustrates receiver 124 detecting a scattered signal scattered by pipeline casing 110. In some embodiments, where in-line inspection device 120 includes multiple transmitters and receivers, and where different transmitters are transmitting signals at different frequencies, different receivers are fine-tuned to detect scattered signals transmitted at different frequencies. In some embodiments, in-line inspection device 120 includes multiple receivers that are circumferentially arranged around the device. In one or more of such embodiments, the receivers are placed at different azimuthal locations to detect signals along different angular sectors of pipeline 112 and pipeline casing 110. In one or more of such embodiments, in-line inspection device 120 includes a transmitter and a receiver pair fine-tuned to transmit signals that scatter after interacting with pipeline casing 110 and to detect scattered signals scattered by pipeline casing 110. Further, in-line inspection device 120 also includes a transmitter and a receiver pair (122 and 124, respectively) that are fine-tuned to transmit signals that scatter after interacting with pipeline 112 and to detect scattered signals scattered by pipeline 112. In some embodiments, in-line inspection device 120 also includes a bucking coil or another component or device operable of reducing or minimizing direct coupling between the transmitter and the receiver, thereby improving recovery of the scattered signals.

At block S308, the in-line inspection device determines a location of an anomaly of the protective casing based on the scattered signal. In some embodiments, processors of in-line inspection device 120 perform an inversion of data indicative of the scattered signal and determine a wall-thickness of pipeline casing 110 based on the inversion of the scattered signal. In some embodiments, in-line inspection device 120, after determining a location of an anomaly, also transmits the location of the anomaly to a surface-based electronic device. In some embodiments, in-line inspection device 120 also transmits data indicative of the scattered signals and a request for the surface-based electronic device to analyze the wall-thickness of the pipeline 112 or pipeline casing 110 at the location of the anomaly.

Figure 4:
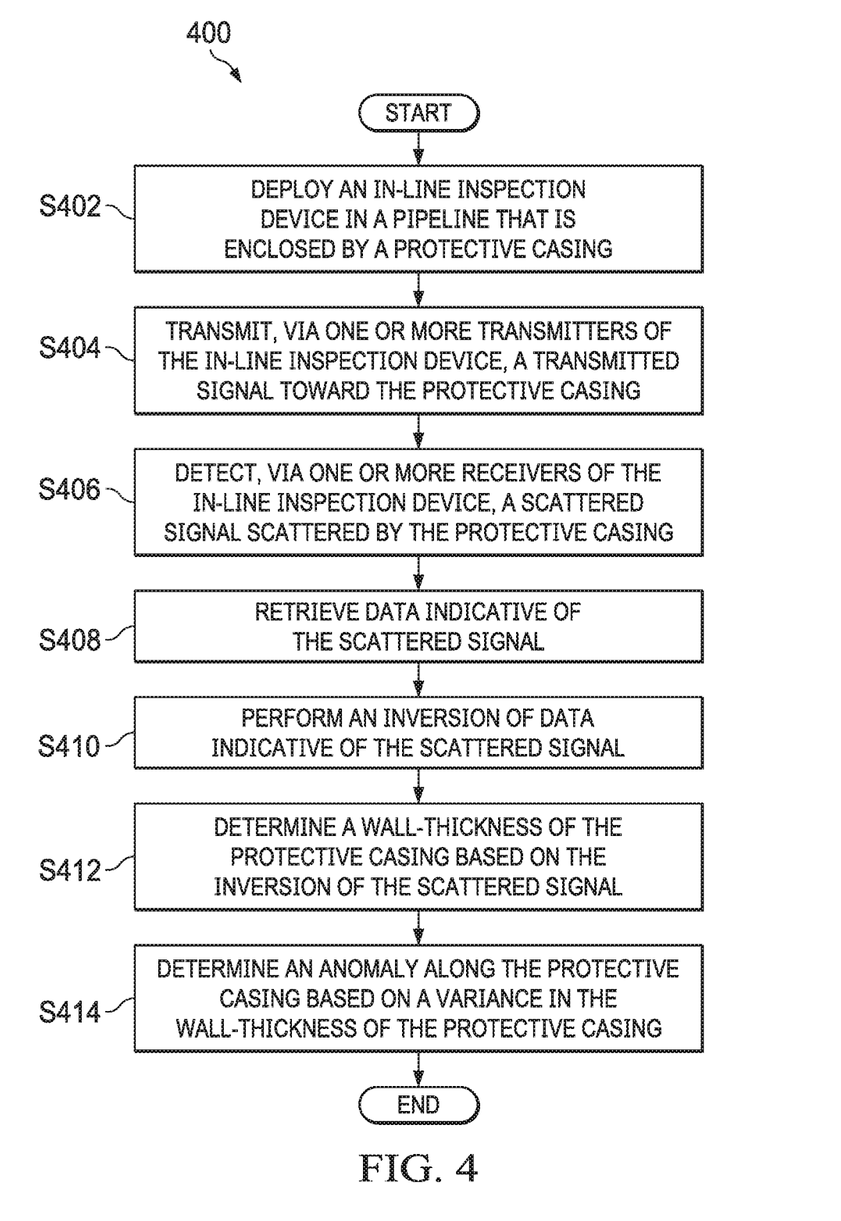
FIG. 4 is a flow chart of a process to perform an in-line inspection of a pipeline and a protective casing.

FIG. 4 is a flow chart of a process to perform an in-line inspection of a pipeline and a protective casing. Although the operations in the process 400 are shown in a particular sequence, certain operations may be performed in different sequences or at the same time where feasible.

At block S402, an in-line inspection device, such as in-line inspection device 120 of FIG. 1, is deployed in a pipeline with encased sections, such as pipeline 112 of FIG. 1. At block S404, the in-line inspection device transmits, via one or more transmitters of the in-line inspection device, a transmitted signal toward the protective casing. In the embodiment of FIG. 1, transmitter 122 of in-line inspection device 120 transmits signals (including the first transmitted signal) while in-line inspection device 120 is traveling in pipeline 112 in a direction indicated by arrow 146. At block S406, the in-line inspection device detects, via one or more receivers of the in-line inspection device, a scattered signal scattered by the protective casing. In the embodiment of FIG. 1, receiver 124 of in-line inspection device 120 receives the scattered signal scattered by pipeline casing 110.

At block S408, the in-line inspection device retrieves data indicative of the scattered signal. In some embodiments, the in-line inspection device retrieves data indicative of the scattered signal that are stored locally on a storage medium component of the in-line inspection device. In some embodiments, data indicative of the scattered signal are stored on a subsurface or surface-based storage medium that is accessible by the in-line inspection device. At block S410, the in-line inspection device performs an inversion of data indicative of the scattered signal. At block S412, the in-line inspection device determines a wall-thickness of the protective casing, at a location of the anomaly based on the inversion of the scattered signal. In some embodiments, in-line inspection device 120 also determines the wall-thickness of the protective casing at and around the location of the anomaly. In some embodiments, the processors also determine an eccentricity of the protective casing. At block 5414, the in-line inspection device determines an anomaly of the protective casing based on a variance in the wall-thickness of the pipeline casing 110. For example, in the embodiment illustrated in FIG. 2, the processors determine that the thickness of pipeline casing 110 at location 240 is less than an acceptable threshold thickness of pipeline casing 110 and determines the presence of an anomaly at location 240 of pipeline casing 110. In some embodiments, the processors of the in-line inspection device also determine an azimuthal and linear location of the anomaly.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flow charts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure:

Clause 1, a method to determine anomalies of a pipeline and a protective casing, the method comprising deploying an in-line inspection device in a section of a pipeline enclosed by a protective casing while the in-line inspection device is traveling along the pipeline: transmitting, at a frequency, a transmitted signal toward the protective casing; and detecting a scattered signal scattered by the protective casing; and locating an anomaly of the protective casing based on the scattered signal.

Clause 2, the method of clause 1, wherein the transmitted signal is transmitted by a transmitter of the in-line inspection device, wherein the scattered signal is detected by a receiver of the in-line inspection device, and the method further comprises reducing direct coupling between the transmitter and the receiver to improve recovery of the scattered signal.

Clause 3 method of clauses 1 or 2, wherein the frequency is between 30 Hz and 1 kHz.

Clause 4, the method of clause 3, wherein a value of the frequency monotonically increases relative to a velocity the in-line inspection device travels along the pipeline.

Clause 5, the method of any of clauses 1-4, further comprising: transmitting a second transmitted signal at a second frequency different from the first frequency of the first transmitted signal; detecting a second scattered signal corresponding to the second transmitted signal and scattered by the pipeline; and locating an anomaly of the pipeline based on the second scattered signal.

Clause 6, the method of clause 5, wherein the second frequency is higher than the first frequency.

Clause 7, the method of any of clauses 1-6, wherein locating the anomaly comprises determining a location of the anomaly while the in-line inspection device is traveling along the pipeline.

Clause 8, the method of any of clauses 1-7, wherein locating the anomaly comprises locating a linear and an azimuthal location of the anomaly.

Clause 9, the method of any of clauses 1-8, further comprising determining a wall-thickness of the protective casing at a location of the anomaly.

Clause 10, the method of any of clauses 1-9, further comprising storing data indicative of a location of the anomaly and the scattered signal in a storage medium component of the in-line inspection device.

Clause 11, the method of any of clauses 1-10, further comprising performing an inversion of data indicative of the scattered signal; and determining a wall-thickness of the protective casing at a location of the anomaly based on the inversion of the scattered signal.

Clause 12, the method of any of clauses 1-11, further comprising determining an eccentricity of the protective casing based on the scattered signal.

Clause 13, the method of any of clauses 1-12, wherein the in-line inspection device travels along the pipeline at an inspection velocity of between approximately 1 foot per minute and 7 feet per second.

Clause 14, an in-line inspection device, comprising: one or more transmitters operable to: transmit a transmitted signal toward a protective casing while the in-line inspection device is traveling inside a pipeline that is enclosed by the protective casing; one or more receivers operable to detect a scattered signal scattered by the protective casing while the in-line inspection device is traveling along the pipeline; one or more processors operable to determine a presence of an anomaly of the protective casing based on the scattered signal; and a storage medium for storing data indicative of the scattered signal.

Clause 15, the in-line inspection device of clause 14, further comprising one or more transmitters operable to transmit a second transmitted signal toward the pipeline while the in-line inspection device is traveling inside the pipeline, and one or more receivers operable to detect a second scattered signal scattered by the pipeline while the in-line inspection device is traveling along the pipeline, wherein the one or more processors are further operable to determine the presence of an anomaly of the pipeline based on the second scattered signal.

Clause 16, the in-line inspection device of clauses 14 or 15, wherein the one or more transmitters that are circumferentially spaced around the in-line inspection device, wherein each transmitter of the one or more of transmitters is operable to transmit transmitted signals toward a respective angular sector of the pipeline, wherein the one or more receivers are circumferentially spaced around the in-line inspection device, and wherein each receiver of the one or more of receivers is operable to detect scattered signals in a respective angular sector of the pipeline.

Clause 17, the in-line inspection device of clause 16, wherein the one or more of transmitters transmit the transmitted signals at an approximately identical frequency.

Clause 18, the in-line inspection device of any of clauses 14-17, wherein the one or more processors are further operable to determine a linear and an azimuthal location of the anomaly based on the scattered signal.

Clause 19, a method to perform an in-line inspection of a pipeline and protective casing, the method comprising: deploying an in-line inspection device in a pipeline, wherein a section of the pipeline is enclosed by a protective casing, and wherein while the in-line inspection device is traveling along the pipeline, the in-line inspection device is operable to: transmit, via one or more transmitters of the in-line inspection device, a transmitted signal toward the protective casing; and detect, via one or more receivers of the in-line inspection device, a scattered signal scattered by the protective casing; retrieving data indicative of the scattered signal; performing an inversion of data indicative of the scattered signal; determining a wall-thickness of the protective casing based on the inversion of the scattered signal; and determining an anomaly of the protective casing based on a variance in the wall-thickness of the protective casing.

Clause 20, the method of clause 19, further comprising determining an eccentricity of the protective casing.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

The invention claimed is:

1. A method to determine anomalies of a pipeline and a protective casing, the method comprising:
    deploying an In-Line Inspection device in a section of a pipeline, wherein the section of the pipeline is enclosed by a protective casing;
    while the In-Line Inspection device is traveling along the pipeline,
        generating a magnetic field that induces an eddy current in the pipeline;
        transmitting, at a first frequency, signals towards the protective casing, wherein the signals are partially scattered in response to interacting with the protective casing; and
        detecting a first scattered signal caused by the protective casing, wherein the scattered signal is indicative of an altered electromagnetic wave generated by the eddy current; and
    locating an anomaly of the protective casing based on the first scattered signal.

2. The method of claim 1, wherein the signals are transmitted by a transmitter of the In-Line Inspection device, wherein the first scattered signal is detected by a receiver of the In-Line Inspection device, and the method further comprising reducing direct coupling between the transmitter and the receiver to improve recovery of scattered signals.

3. The method of claim 1, wherein the first frequency is between 30 Hz and 1 kHz.

4. The method of claim 3, wherein a value of the first frequency monotonically increases relative to a velocity the In-Line Inspection device travels along the pipeline.

5. The method of claim 1, wherein the signals are partially scattered in response to interacting with the pipeline, and the method further comprising:
    detecting a second scattered signal caused by the pipeline; and
    locating the anomaly of the pipeline based on the second scattered signal caused by the pipeline.

6. The method of claim 5, further comprising transmitting, at a second frequency, signals towards the pipeline, wherein the second frequency is higher than the first frequency, and wherein the signals transmitted at the second frequency are partially scattered in response to interacting with the pipeline.

7. The method of claim 1, wherein locating the anomaly comprises determining a location of the anomaly while the In-Line Inspection device is traveling along the pipeline.

8. The method of claim 7, further comprising transmitting signals indicative of the anomaly of the protective casing while the In-Line Inspection device is traveling along the pipeline.

9. The method of claim 1, wherein locating the anomaly comprises locating a linear and an azimuthal location of the anomaly.

10. The method of claim 1, further comprising determining a wall-thickness of the protective casing at a location of the anomaly.

11. The method of claim 1, further comprising storing data indicative of a location of the anomaly and scattered contributions in a storage medium component of the In-Line Inspection device.

12. The method of claim 1, further comprising:
    performing an inversion of data indicative of the first scattered signal; and
    determining a wall-thickness of the protective casing at a location of the anomaly based on the inversion of the first scattered signal.

13. The method of claim 1, further comprising determining an eccentricity of the protective casing.

14. The method of claim 1, wherein the In-Line Inspection device travels along the pipeline at an inspection velocity of between approximately 1 foot per minute and 7 feet per second.

15. An In-Line Inspection device, comprising:
    a first transmitter operable to:
        generate a magnetic field that induces an eddy current in a pipeline that is enclosed by a protective casing; and
        transmit signals towards the protective casing while the In-Line Inspection device is traveling inside the pipeline, wherein the signals are partially scattered in response to interacting with the protective casing;
    a first receiver operable to detect a first scattered signal caused by the protective casing while the In-Line Inspection device is traveling along the pipeline, wherein the scattered signal is indicative of an altered electromagnetic wave generated by the eddy current;
    one or more processors operable to determine a presence of an anomaly of the protective casing based on the first scattered signal; and
    a storage medium for storing data indicative of the first scattered signal.

16. The In-Line Inspection device of claim 15, further comprising a second transmitter operable to transmit signals towards the pipeline while the In-Line Inspection device is traveling inside the pipeline, and a second receiver operable to detect a second scattered signal caused by the pipeline while the In-Line Inspection device is traveling along the pipeline, wherein the one or more processors are further operable to determine the presence of an anomaly of the pipeline based on the second scattered signal detected by the second receiver.

17. The In-Line Inspection device of claim 15, further comprising:
    a plurality of transmitters that are circumferentially spaced around the In-Line Inspection device, each transmitter of the plurality of transmitters being operable to transmit signals towards a respective angular sector of the pipeline; and
    a plurality of receivers that are circumferentially spaced around the In-Line Inspection device, each receiver of the plurality of receivers being operable to detect scattered signals in a respective angular sector of the pipeline, wherein the first transmitter is a transmitter of the plurality of transmitters and wherein the first receiver is a receiver of the plurality of receivers.

18. The In-Line Inspection device of claim 17, wherein the plurality of transmitters transmit signals at an approximately identical frequency.

19. A method to perform an in-line inspection of a pipeline and protective casing, the method comprising:

deploying an In-Line Inspection device in a pipeline, wherein a section of the pipeline is enclosed by a protective casing, and wherein while the In-Line Inspection device is traveling along the pipeline, the In-Line Inspection device is operable to:

generate a magnetic field that induces an eddy current in the pipeline;

transmit, via a transmitter of the In-Line Inspection device, signals towards the protective casing, wherein the signals are partially scattered in response to interacting with the protective casing; and detect, via one or more receivers of the In-Line Inspection device, a first scattered signal caused by the protective casing, wherein the scattered signal is indicative of an altered electromagnetic wave generated by the eddy current;

retrieving data indicative of the first scattered signal;

performing an inversion of data indicative of the first scattered signal;

determining a wall-thickness of the protective casing based on the inversion of the first scattered signal; and determining an anomaly of the protective casing based on a variance in the wall-thickness of the protective casing.

20. The method of claim 19, further comprising determining an eccentricity of the protective casing.

* * * * *